United States Patent
Tam et al.

(10) Patent No.: US 10,451,882 B2
(45) Date of Patent: Oct. 22, 2019

(54) HINGED LENS CONFIGURATION FOR A COMPACT PORTABLE HEAD-MOUNTED DISPLAY SYSTEM

(71) Applicant: Sharp Kabushiki Kaisha, Osaka (JP)

(72) Inventors: Ka Ho Tam, Oxford (GB); David James Montgomery, Oxford (GB); Scott Wells, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/923,038

(22) Filed: Mar. 16, 2018

(65) Prior Publication Data

US 2019/0285879 A1    Sep. 19, 2019

(51) Int. Cl.
*G02B 27/01* (2006.01)
*G02B 27/00* (2006.01)
*G02B 17/00* (2006.01)

(52) U.S. Cl.
CPC ....... *G02B 27/0172* (2013.01); *G02B 17/004* (2013.01); *G02B 17/008* (2013.01); *G02B 27/0081* (2013.01); *G02B 27/017* (2013.01); *G02B 27/0176* (2013.01)

(58) Field of Classification Search
CPC .............. G02B 27/017; G02B 27/0172; G02B 27/0176; G02B 27/0081; G02B 17/004; G02B 17/008
See application file for complete search history.

(56) References Cited

U.S. PATENT DOCUMENTS

| | | | | |
|---|---|---|---|---|
| 4,571,628 A | * | 2/1986 | Thornton | G11B 31/006 348/333.08 |
| 5,392,158 A | * | 2/1995 | Tosaki | G02B 27/017 348/42 |
| 5,418,581 A | | 5/1995 | Conway | |
| 5,815,126 A | * | 9/1998 | Fan | G02B 27/017 345/7 |

(Continued)

FOREIGN PATENT DOCUMENTS

| | | |
|---|---|---|
| CN | 205318026 | 6/2016 |
| CN | 205507242 | 8/2016 |

(Continued)

*Primary Examiner* — Bao-Luan Q Le
(74) *Attorney, Agent, or Firm* — Renner, Otto, Boisselle & Sklar, LLP

(57) ABSTRACT

A head-mounted display (HMD) system includes an optical arrangement, a first image panel, a second image panel, and a central image panel located between the first and second image panels. The optical arrangement is reconfigurable between a first position and a second position that maintains first and second optical pathways of the first and second image panels, and the HMD system has a different form factor when the optical arrangement is in the second position as compared to the first position. The optical arrangement includes at least one segmented optical component, wherein segments of the segmented optical component are moveable relative to each other to reconfigure the optical arrangement between the first position and the second position. The segmented optical component may include one more lens assemblies, each with multiple lens segments that are rotatable relative to each other about a hinge structure.

15 Claims, 10 Drawing Sheets

(56) References Cited

U.S. PATENT DOCUMENTS

| | | | | |
|---|---|---|---|---|
| 5,933,279 | A * | 8/1999 | Yamazaki | G02B 17/0832 345/7 |
| 5,982,343 | A * | 11/1999 | Iba | G02B 27/0172 345/8 |
| 6,377,402 | B1 * | 4/2002 | Ma | G02B 27/0172 359/631 |
| 6,388,640 | B1 * | 5/2002 | Chigira | G02B 27/0176 345/8 |
| 6,421,031 | B1 * | 7/2002 | Ronzani | G02B 27/017 345/8 |
| 6,424,321 | B1 * | 7/2002 | Ronzani | G02B 27/017 345/102 |
| 6,803,884 | B1 * | 10/2004 | Ohzawa | G02B 27/0172 345/1.1 |
| 6,989,935 | B2 * | 1/2006 | Domjan | G02B 27/0172 345/8 |
| 7,057,824 | B2 * | 6/2006 | Domjan | G02B 27/0172 345/8 |
| 7,199,935 | B2 * | 4/2007 | Inoguchi | G02B 27/0172 359/631 |
| 7,408,715 | B2 * | 8/2008 | Inoguchi | G02B 27/0172 359/633 |
| 7,414,792 | B2 * | 8/2008 | Domjan | G02B 27/0172 345/8 |
| 7,430,078 | B2 * | 9/2008 | Domjan | G02B 27/0172 345/8 |
| 7,616,382 | B2 * | 11/2009 | Inoguchi | G02B 27/1066 345/9 |
| 7,764,431 | B2 * | 7/2010 | Domjan | G02B 27/0172 345/8 |
| 7,864,459 | B2 * | 1/2011 | Tohara | G02B 27/0172 359/811 |
| 7,982,972 | B2 * | 7/2011 | Inoguchi | G02B 27/1066 359/629 |
| 8,259,164 | B2 * | 9/2012 | Saito | G02B 17/004 348/49 |
| 8,366,279 | B2 * | 2/2013 | Inoguchi | G02B 27/0172 345/7 |
| 8,437,087 | B2 * | 5/2013 | Tohara | G02B 27/0172 345/7 |
| 9,606,612 | B2 * | 3/2017 | Milford | G06F 1/3231 |
| 10,127,727 | B1 * | 11/2018 | Yuan | G06T 19/006 |
| 2002/0089469 | A1 | 7/2002 | Cone et al. | |
| 2002/0181115 | A1 * | 12/2002 | Massof | G02B 27/017 359/630 |
| 2003/0030597 | A1 * | 2/2003 | Geist | G02B 27/0172 345/8 |
| 2008/0158506 | A1 * | 7/2008 | Fuziak | G02B 27/0172 351/158 |
| 2008/0316606 | A1 * | 12/2008 | Inoguchi | G02B 27/0172 359/630 |
| 2009/0109395 | A1 * | 4/2009 | Fuziak, Jr. | G02B 27/0172 351/158 |
| 2009/0115842 | A1 * | 5/2009 | Saito | G02B 17/004 348/53 |
| 2009/0153960 | A1 * | 6/2009 | Inoguchi | G02B 27/0172 359/482 |
| 2009/0290222 | A1 * | 11/2009 | Inoguchi | G02B 27/0172 359/630 |
| 2010/0164840 | A1 * | 7/2010 | Yamamoto | G02B 17/086 345/8 |
| 2010/0277803 | A1 * | 11/2010 | Pockett | G02B 27/0172 359/567 |
| 2010/0290124 | A1 * | 11/2010 | Tohara | G02B 27/0172 359/630 |
| 2010/0290125 | A1 * | 11/2010 | Tohara | G02B 27/0172 359/630 |
| 2012/0056847 | A1 * | 3/2012 | Milford | G06F 1/3231 345/174 |
| 2016/0195728 | A1 * | 7/2016 | Choi | G02B 27/2257 359/480 |
| 2016/0259170 | A1 * | 9/2016 | Choi | G02B 27/028 |
| 2016/0306600 | A1 * | 10/2016 | Shibata | G06F 3/1423 |
| 2016/0320623 | A1 * | 11/2016 | Miyao | G02B 27/0172 |
| 2016/0377863 | A1 * | 12/2016 | Eromaki | G02B 27/0172 359/633 |
| 2017/0199560 | A1 * | 7/2017 | Milford | G06F 1/3231 |
| 2017/0307896 | A1 * | 10/2017 | Kovaluk | G02B 27/0176 |
| 2017/0371162 | A1 | 12/2017 | Makino | |
| 2018/0098056 | A1 * | 4/2018 | Bohn | G09G 3/003 |
| 2018/0143437 | A1 * | 5/2018 | Kimmel | G02B 6/0016 |

FOREIGN PATENT DOCUMENTS

| | | |
|---|---|---|
| CN | 107272197 | 10/2017 |
| CN | 206573784 | 10/2017 |

* cited by examiner

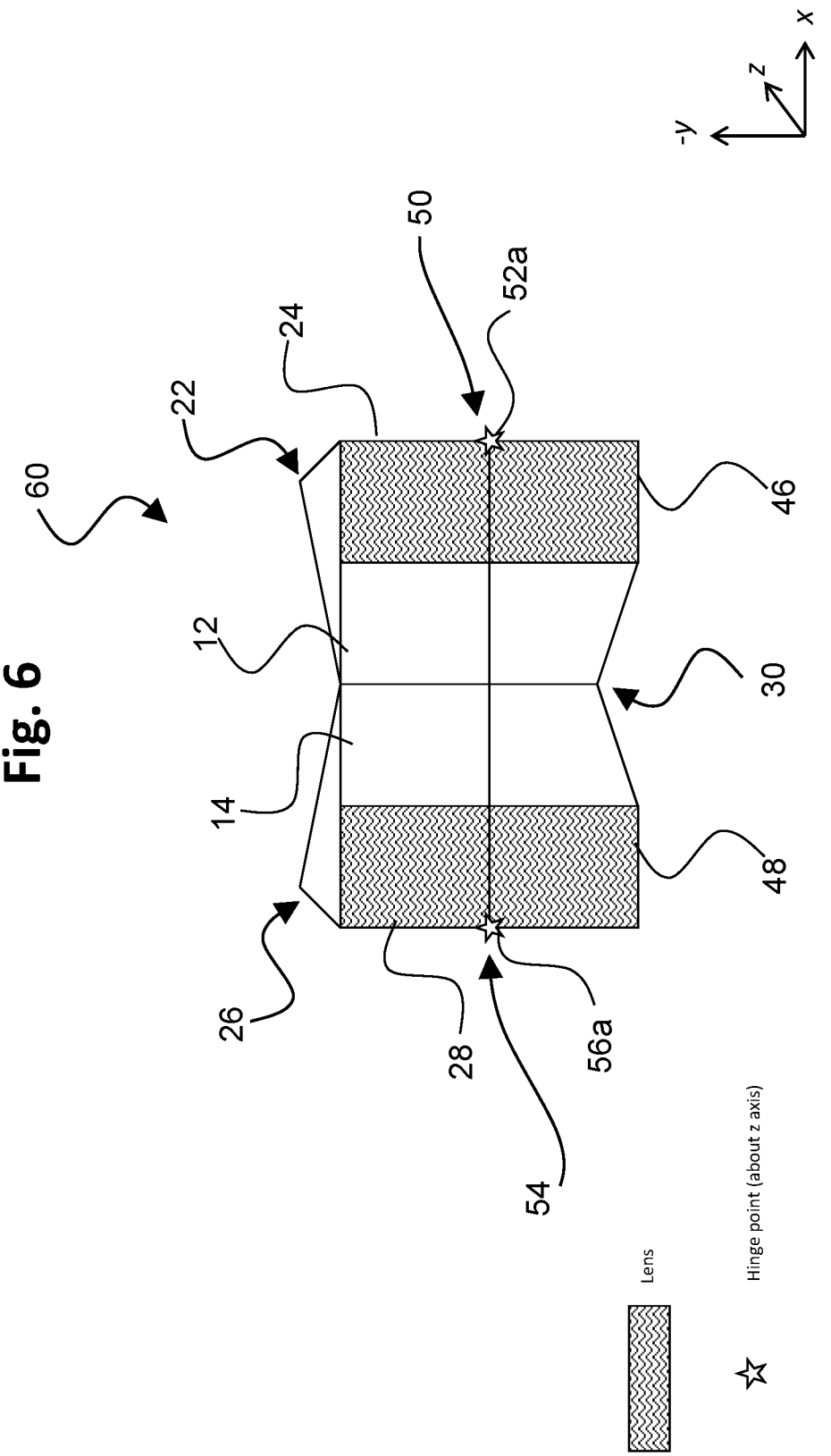

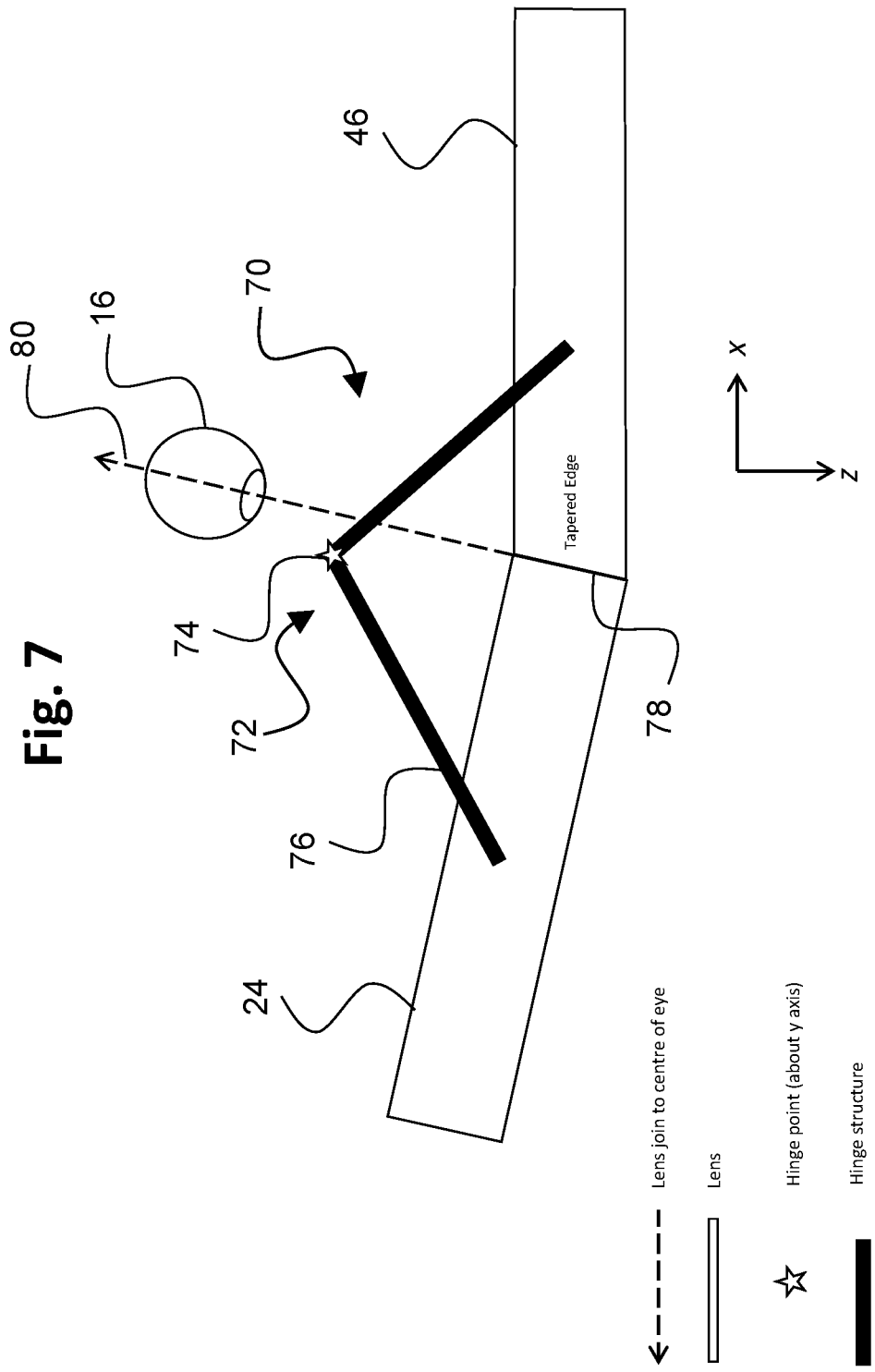

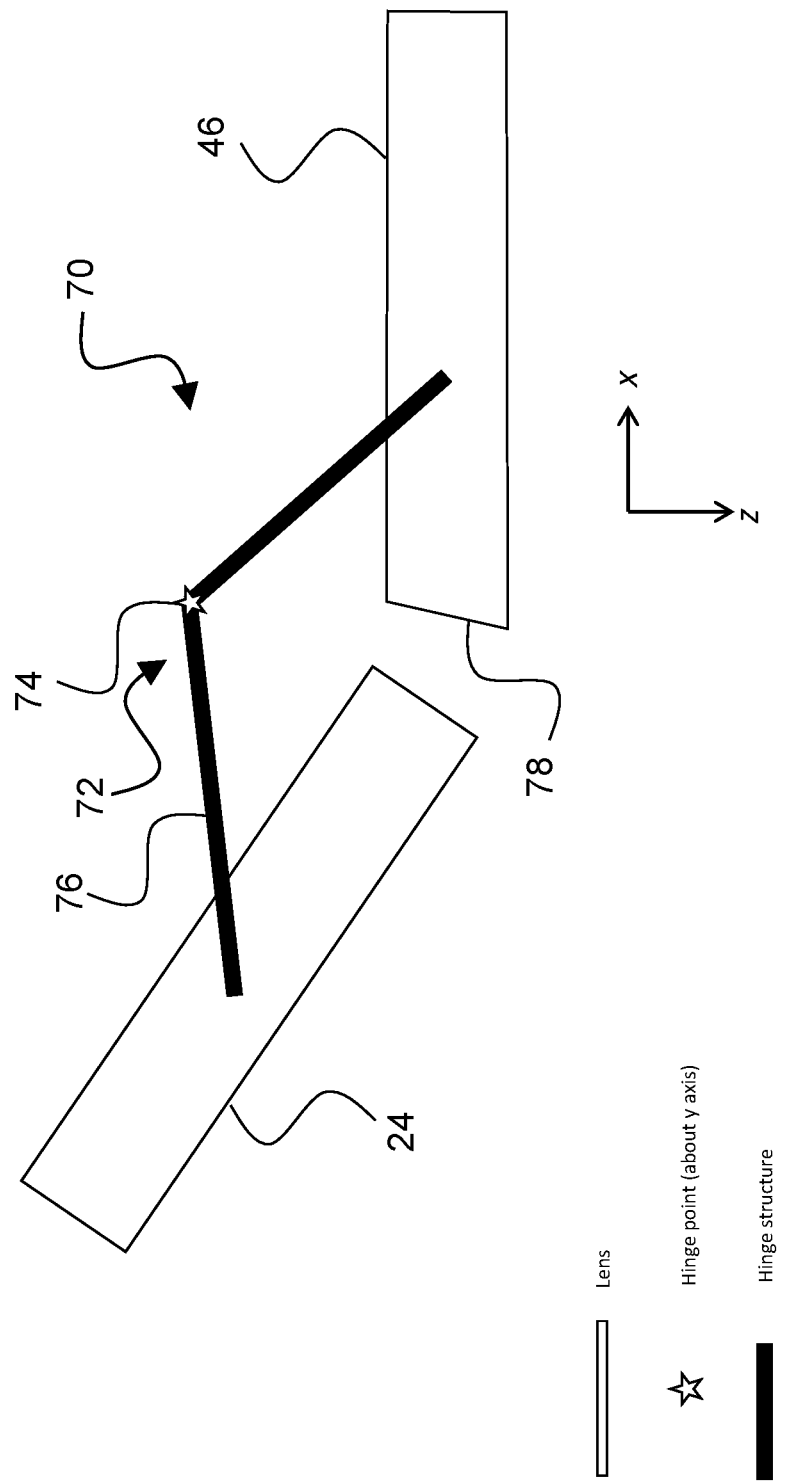

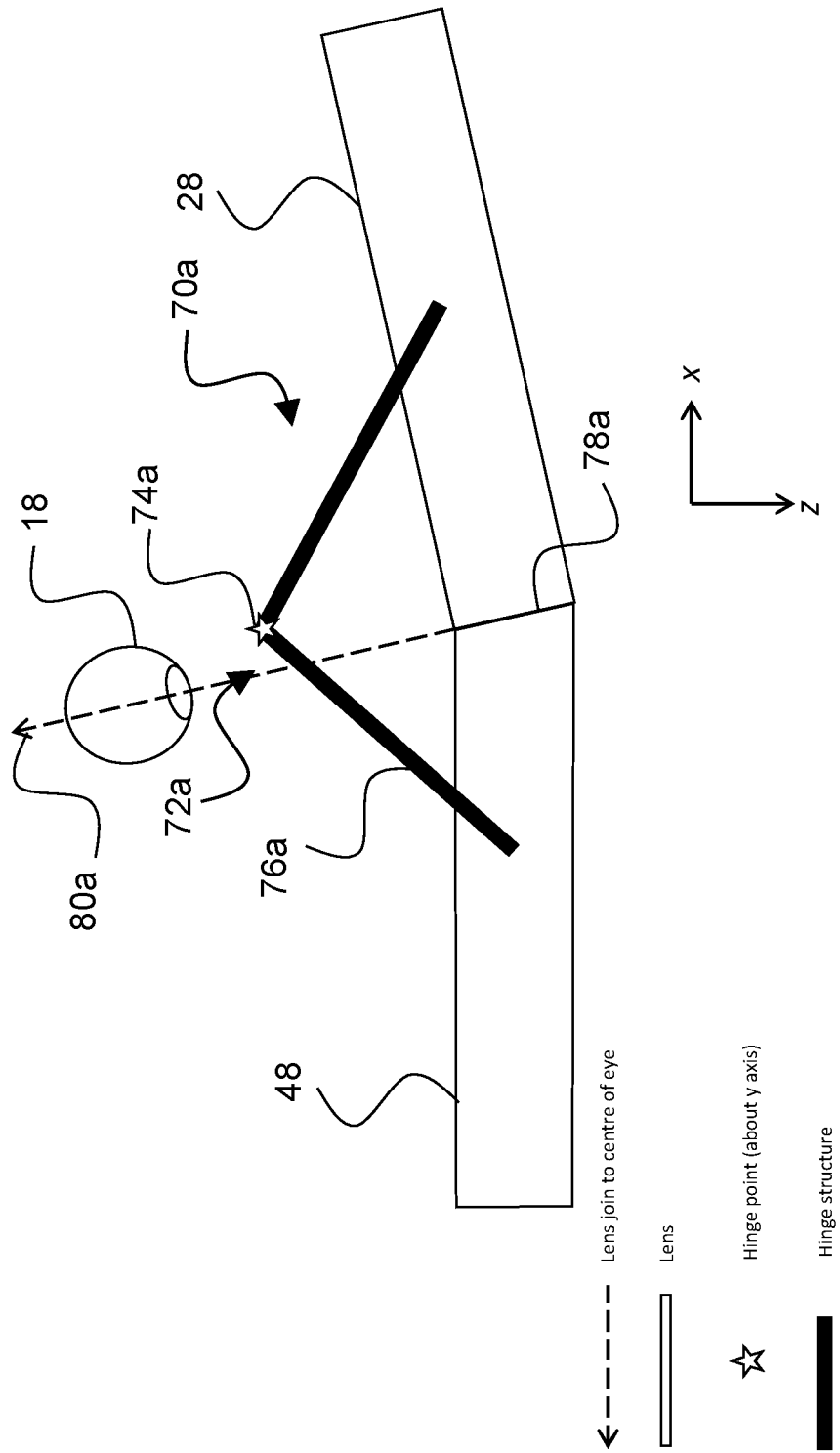

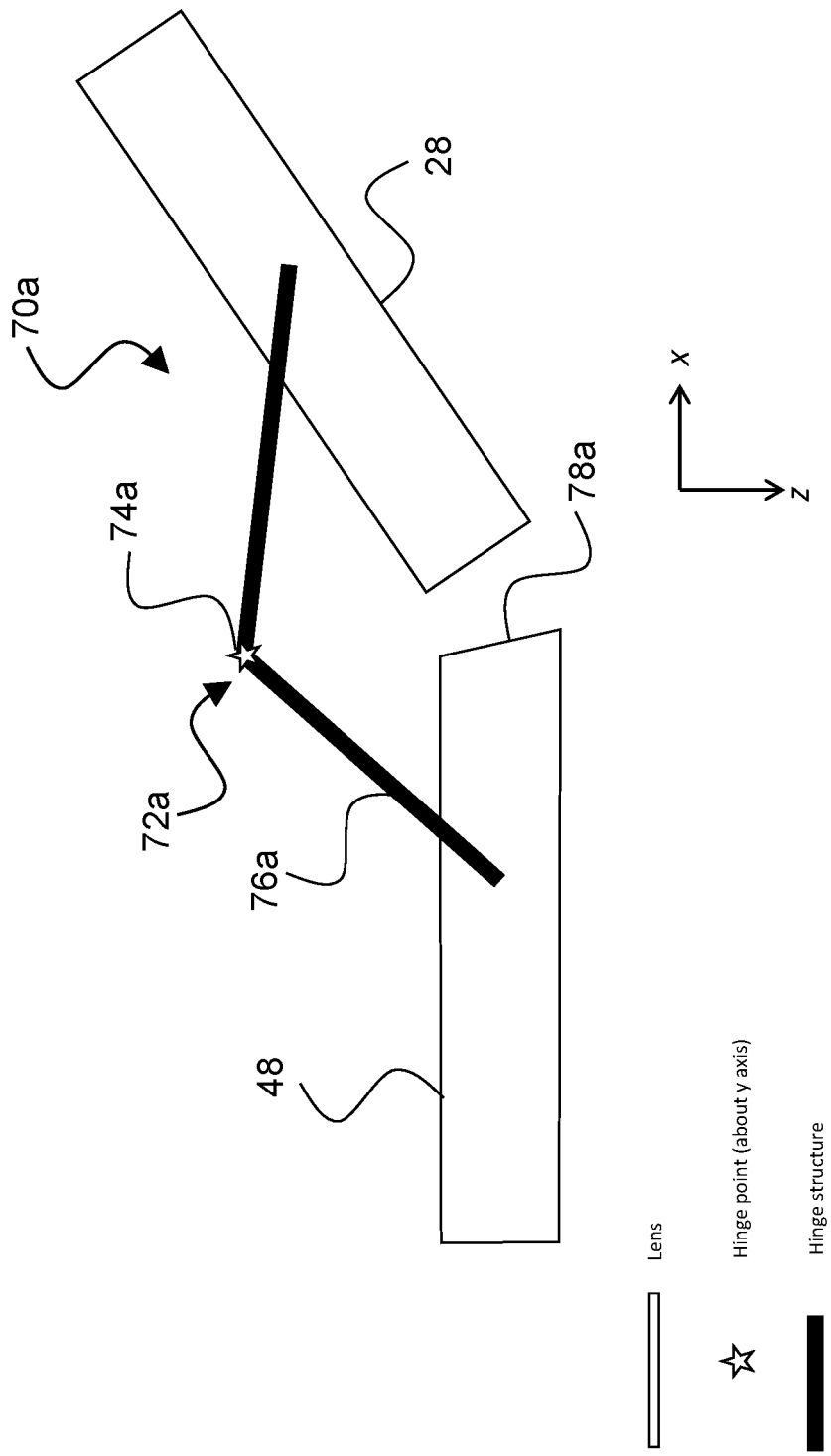

HINGED LENS CONFIGURATION FOR A COMPACT PORTABLE HEAD-MOUNTED DISPLAY SYSTEM

TECHNICAL FIELD

The present invention has application within the field of compact wearable displays, and in particular, head-mounted display (HMD) systems used for applications such as virtual reality and augmented reality.

BACKGROUND ART

A head-mounted display (HMD) system is a type of wearable device with increasing popularity within the consumer electronics industry. HMDs, along with similar devices such as helmet-mounted displays, smart glasses, and virtual reality headsets, allow users to wear a display device such that the hardware remains fixed to their heads regardless of the user's movement.

When combined with environmental sensors such as cameras, accelerometers, gyroscopes, compasses, and light meters, HMDs can provide users with experiences in virtual reality and augmented reality. Virtual reality (VR) allows a user to be completely submerged into a virtual world where everything the user sees comes from the display device. Devices that provide augmented reality (AR) allow users to optically see the environment, and images generated by the display device are added to the scene and may blend in with the environment. Accordingly, traditional VR and AR technology involve a display that is mounted in front of the user's head with a lens configuration that determines the virtual image position and field.

A basic layout of typical commercial VR or AR systems (both involving and not involving use of a smartphone for a display) includes a display device and a lens structure that images the display light into the far field to enable comfortable viewing. To ensure sufficient magnification, with wide field of view and to have a virtual image at a far enough distance from the eye, the size of this arrangement is restricted. In addition, the display is a relatively far distance from the eyes, meaning that the device must be strapped to the head to not fall off. Furthermore, the weight of the device is far forward when worn, meaning that long term viewing could become tiresome on the face and neck due to the torque generated about the head by the weight of the device. Lens elements used in such systems may be configured as a normal curved surface lens of known type, or a structured Fresnel lens with angled features of known type, or other known lens arrangements involving one or more lenses.

One of the primary elements of HMDs is the display module mounted onto the head. However, since the unaided human eye cannot accommodate (that is, change optical power to provide a focused image) for images closer than a certain distance from the eye, eyepiece lenses are required to re-image the display module such that the display image appears to be at a comfortable viewing distance from the user. Such optical configuration requires substantial space between the eyepiece and the display module. Furthermore, complex lenses are needed if the HMD needs to display images with high quality and a wide field of view (FOV). The result of these requirements in conventional systems is a heavy and bulky headset that is uncomfortable to wear for any length of time, and the size is limited by basic optics to achieve the correct magnification and the virtual image distance.

Due to the bulkiness of conventional configurations, portability has become an issue in that conventional HMD systems take up substantial space for storage and transport. In one type of HMD systems, image panels are permanently installed into the HMD system with appropriate magnifying optics. This type of HMD arrangement includes a display device and lens components that display an image into the far field to enable comfortable viewing. The lens and display are both mounted within some form of fixed housing. A fixed housing in this regard is a structure that maintains the optical components' relative positions and orientations from which the optical components cannot be removed. In this respect, the display is considered one of the optical components. Many such systems are not foldable and have a fixed form factor. In alternative arrangements, attempts have been made to reduce the form factor, which involve keeping the optical components fixed and providing folding parts of the HMD housing, such as with respect to head-straps and/or side-arms. As the size of display and lens-display distance determines the form factor in simple magnifying HMDs, there is little decrease in the form factor by using these methods of providing foldable housing structures while maintaining the optical components fixed.

In another type of HMD system, a frame or housing is provided to incorporate or "drop-in" a smartphone. With drop-in smartphone type HMD systems, it is typically expected that the user will remove the smartphone after use with the HMD system. This removes the lens-display distance constraint and allows the HMD frame or housing to be foldable or otherwise re-configurable in absence of the smartphone. A reconfigurable housing in this regard is a structure that maintains the optical components' relative positions and orientations from which the optical components can be inserted and removed. In typical commercial systems, the display is implemented in the form of a smartphone that can easily be removed from the housing with a snap-fit or similar operation. When one or more of the optical components are removed from the housing (e.g., by removal of a smartphone), the housing can then be reconfigured in some way (e.g. folding, bending) so that it can be conveniently stored and transported. The benefit of portability, however, is generally offset by the lower image quality of drop-in smartphone type HMD systems.

There have been other attempts to reduce the HMD form factor using multiple small lenses with overlapping images that modify the magnification required. For example, the Applicant's commonly owned Application GB 1621621.0, filed Dec. 19, 2016, describes an alternative image overlap system with two displays and a folded W-shaped mirror arrangement. The field of view in this case is defined by the maximum aperture and path length. Although such a system reduces the overall form factor during use as compared to prior conventional configurations, in this initial design the form factor is fixed and therefore the reduction of the form factor during periods of non-use, such as for storage and transport, still have been limited by the optical requirements of usage.

SUMMARY OF INVENTION

There is a need in the art, therefore, for an enhanced HMD system that is compact and comfortable to wear, without sacrificing image quality as needed for optimal VR and AR applications, and that further is readily portable and stored. The present invention provides for HMD configurations that are light weight and comfortable for viewing, with high image quality and a wide field of view (FOV). In addition, embodiments of the disclosed HMD system permit a compact foldable HMD system to realized. HMD configurations are disclosed that solve the existing problems of limited portability by allowing the optical components, rather than simply frame or housing components, to be foldable. In this manner, high image quality is achieved in a non-smartphone configuration with reduced form factors comparable to drop-in smartphone systems.

Regarding the overall form factor, the HMD system of the present disclosure improves the compactness of the system while using a folded optical arrangement. Configurations of the HMD system employ a combination of image panels that are on the eye or viewing side of the eyepiece lenses, close to the head, and also image panels that are on the image or non-viewing side of the eyepiece lenses. An advantage of such an arrangement is that the HMD system protrudes from the face for a distance less than previous designs, and therefore can have significantly reduced weight, be much closer to the face, and hence produces less fatigue while wearing. The design also means near-eye optics can be used to give a large FOV, but also allows space for the user's nose to provide a more comfortable configuration to wear.

In exemplary embodiments, an HMD system includes three image panels of equal dimensions. A first image panel and a second image panel are respectively used to present an image in an unshared fashion respectively to each of the left eye and the right eyes. The HMD system further includes a third image panel that is located centrally relative to the first and second image panels, and the third image panel presents an image that is shared between both left and right eyes. With such a configuration, each of the left and right eyes can see two image panels, one in its entirety (the unshared first and second image panels) and half of the third shared central image panel that is shared by both eyes. Further with such a configuration, images from the various image panels are combined such that the images optimally fill the typical human visual field.

The described configuration has an advantage in that there is as little unseen area on the image panels as practicable, which minimizes the form factor of the HMD system. In addition, with such configuration the optical arrangement allows plenty of room for the user's nose. Furthermore, the weight is concentrated closer to the user's head, so the torque on the head and neck is reduced, and the conventional requirement for a strap to wear the system becomes less necessary. The result is an enhanced HMD system that is compact and comfortable to wear, without sacrificing image quality as needed for optimal VR and AR applications.

In addition, optical components themselves form part of a hinged configuration along which the HMD system can be folded when not in use. The hinged configuration may be combined with any HMD configuration including multiple image panels and/or or segmented eyepiece lens components. An advantage of this hinged configuration is that a user can fold the HMD system for ease of storage and transportation while maintaining a high level of image quality during use.

In exemplary embodiments, for each eyepiece of the HMD system, a lens assembly includes segmented lens components that make up each eyepiece, and a hinge element about which the eyepiece lens segments can be folded. The hinge element, which is not part of the segmented lens components, is located such that the hinge element does not obstruct the user's view when looking into the eyepiece during use of the HMD system. Such a lens assembly configuration is provided in each eyepiece respectively for the left eye and the right eye.

As defined with reference to the HMD system, a z-axis points in a direction from the user to the HMD system, and x- and y-axes follow a right hand rule convention. With directional axes so defined, an axis of rotation for foldable optical components of each eyepiece may be about the y-axis in exemplary embodiments. An axis of rotation for foldable optical components of each eyepiece may be about the z-axis in alternative exemplary embodiments. Having separate optical pathways with different eyepiece lens components and image panels allows the different optical component segments of the HMD system to be rotated with respect to one another so that the optical component segments can be separated and realigned conveniently. This principle could be applied to any configuration of an HMD system having segmented lens components within a respective eyepiece, and/or multiple image panels. In this manner, the HMD system of the present disclosure is highly portable for easy storage and transport while maintaining a high level of image quality during use.

In exemplary embodiments, therefore, a head-mounted display (HMD) system includes an optical arrangement; a first image panel, wherein the optical arrangement includes a first portion that directs image light from the first image panel along a first optical pathway; and a second image panel, wherein the optical arrangement includes a second portion that directs image light from the second image panel along a second optical pathway different from the first optical pathway. The optical arrangement is reconfigurable between a first position and a second position that maintains the first and second optical pathways, and the HMD system has a different form factor when the optical arrangement is in the second position as compared to the first position.

In exemplary embodiments, the optical arrangement includes at least one segmented optical component, wherein segments of the segmented optical component are moveable relative to each other to reconfigure the optical arrangement between the first position and the second position. The at least one segmented optical component may include a first lens assembly comprising lens segments connected by a first hinge structure, and the lens segments of the first lens assembly are rotatable relative to each other about the first hinge structure. The at least one segmented optical component further may include a second lens assembly comprising lens segments connected by a second hinge structure, and the lens segments of the second lens assembly are rotatable relative to each other about the second hinge structure.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 6 is a drawing depicting an isometric view of the exemplary HMD system of FIG. 3, with the HMD system being in a folded state.

FIG. 7 is a drawing depicting a top view of an exemplary lens assembly for an HMD system having an off-edge axis of rotation, with the lens assembly being in an unfolded state.

FIG. 8 is a drawing depicting a top view of the exemplary lens assembly of FIG. 7, with the lens assembly being in a partially folded state.

FIG. 9 is a drawing depicting a top view of an exemplary lens assembly for an HMD system having an off-edge axis of rotation, with the lens assembly being in an unfolded state, for the other eyepiece relative to FIGS. 7 and 8.

FIG. 10 is a drawing depicting a top view of the exemplary lens assembly of FIG. 9, with the lens assembly being in a partially folded state.

DESCRIPTION OF EMBODIMENTS

Figure 1:
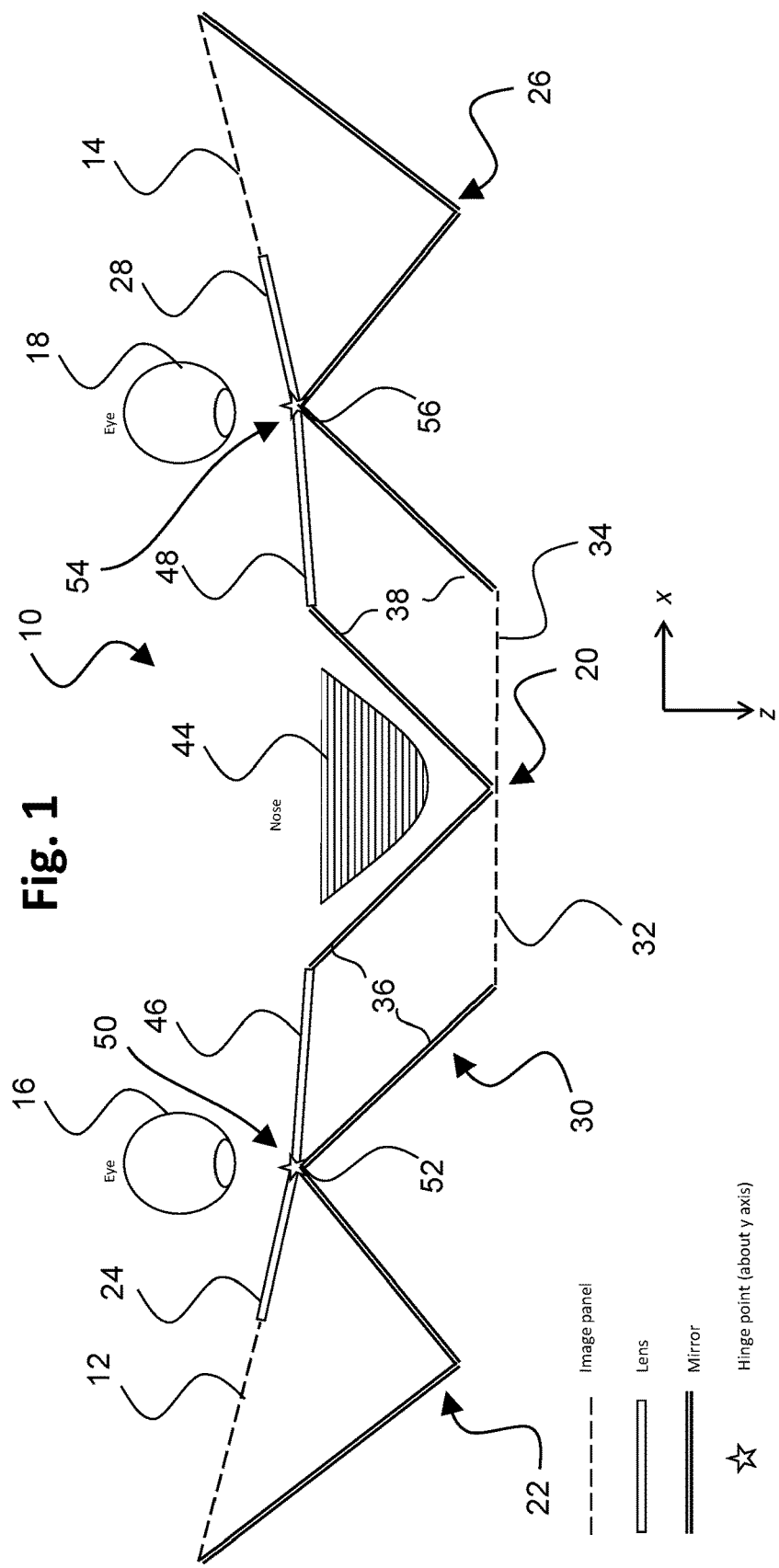
FIG. 1 is a drawing depicting a top view of an exemplary head-mounted display (HMD) system in accordance with embodiments of the present invention, with the HMD system being in an unfolded state.

Embodiments of the present invention will now be described with reference to the drawings, wherein like reference numerals are used to refer to like elements throughout. It will be understood that the figures are not necessarily to scale.

FIG. 1 is a drawing depicting a top view of an exemplary head-mounted display (HMD) system 10 in accordance with embodiments of the present invention, with the HMD system being in an unfolded state. In exemplary embodiments, the HMD system includes three image panels, which may be of equal dimensions. Referring to the figure, a first image panel 12 and a second image panel 14 are respectively used to present an image in an unshared fashion to each of the right eye 16 and the left eye 18 of a user. The HMD system 10 further includes a third or shared image panel 20 that is located centrally relative to the first and second image panels, and the third image panel 20 presents an image that is shared between both left and right eyes. In this primary embodiment, each of the left and right eyes can thus see two image panels, one in its entirety (emitted from the unshared first and second image panels) and half of the third central image panel that is shared by both eyes. With such a configuration, images from the various image panels are combined such that the images optimally fill the typical human visual field. The image display panels may be electronically controlled with suitable electronics incorporated into the HMD system in any suitable manner as is known in the art, so as to emit image light corresponding to the desired images from each image panel. Accordingly, for simplicity of illustration the control electronics is omitted from the figures.

In configurations of the HMD system 10, the unshared first and second image panels 12 and 14 are located on the viewing or eye side of the HMD system, close to the head. The central shared image panel 20 is located on the non-viewing or imaging side of the HMD system. An advantage of such an arrangement is that the HMD system protrudes from the face for a distance less than previous designs, and therefore can have a significantly reduced weight.

The system overall is positioned much closer to the face as compared to conventional configurations, and hence produces less torque relative to the head thereby reducing fatigue while wearing. The design also means near-eye optics can be used to give a large FOV, but also allows space for the user's nose to provide a more comfortable configuration to wear.

In exemplary embodiments, an optical arrangement for directing image light from the display panels includes a plurality of mirror components and a plurality of lens components, wherein the plurality of mirror components are configured to direct image light from the first, second, and central image panels along respective optical pathways to the plurality of lens components. Referring to FIG. 1, the optical arrangement may be configured as follows. As associated with the first, unshared image panel 12, a first mirror assembly 22 directs image light from the first image panel 12 along a first optical pathway to a first lens component 24, and ultimately to the right eye 16. To minimize the size or footprint of the HMD system, the first mirror assembly 22 may be configured with a plurality of mirror segments in a "folded" or wedge-shaped arrangement, whereby the optical path of light is increased while maintaining a minimal size. With such configuration, light emitted from the first image panel 12 is directed by the mirror segments of the first mirror assembly 22 only through the first lens component 24, and thus only to one (the right) eye. The first image panel 12, therefore, is referred to as an "unshared" image panel in that the image light from the first image panel 12 is directed along the first optical pathway only to a single eye, in this case the right eye.

Similarly, as associated with the second image panel 14, the HMD system 10 further includes a second mirror assembly 26 that directs image light from the second, unshared image panel 14 along a second optical pathway different from the first optical pathway, to a second lens component 28 and ultimately to the left eye 18. Similarly to minimize the size or footprint of the HMD system, the second mirror assembly also may be configured with a plurality of mirror segments in a "folded" or wedge-shaped arrangement, whereby the optical path of light is increased while maintaining a minimal size. With such a configuration, light emitted from the second image panel 14 is directed by the mirror segments of the second mirror assembly 26 only through the second lens component 28, and thus only to one (the left) eye. The second image panel 14, therefore, also is an "unshared" image panel in that the image light from the second image panel 14 is directed along the different second optical pathway only to the other single eye, in this case the left eye.

As associated with the third and shared central image panel 20, the HMD system 10 further includes a third mirror assembly 30 that directs image light from the third image panel 20 through additional lens components as follows. The third image panel is divided into a first image panel portion 32 and a second image panel portion 34, such that image light emitted from the first image panel portion 32 is directed to one (e.g., the right) eye 16, and image light emitted from the second image panel portion 34 is directed to the other (e.g., the left) eye 18 along different optical pathways. Commensurately, the third mirror assembly 30 includes a first mirror portion 36 that directs the image light emitted from the first image panel portion 32, and a second mirror portion 38 that directs the image light emitted from the second image panel portion 34.

The third mirror assembly 30 also is configured as a plurality of mirror segments that are arranged to (1) appropriately direct the image light from the central image panel as described above, and (2) provide a compact and easily worn configuration. For particular mirror segments, the first mirror portion 36 includes a first nose segment adjacent to the user's nose 44 when worn, and a first external segment opposite from the first nose segment. Similarly, the second first mirror portion 38 includes a second nose segment adjacent to the user's nose 44 when worn, and a second external segment opposite from the second nose segment. The nose segments are arranged to accommodate the user's nose 44 when the HMD system is worn, with the external segments permitting a controlled directing of the image light in a compact arrangement. As seen in FIG. 1, the first and second nose segments may meet to form a wedge shape to minimize size, and the first and second external segments may be spaced apart from and parallel to respective nose segments.

The first mirror portion 36 of the shared mirror assembly 30 directs light emitted from the first image panel portion 32 of shared image panel 20 to a third lens component 46. The second mirror portion 38 of the shared mirror assembly 30 directs light emitted from the second image panel portion 34 of shared image panel 20 to a fourth lens component 48. The third and fourth lens components respectively direct light to the right eye and left eye. Furthermore, as seen in the example of FIG. 1, the third lens component 46 may be contiguous with the first lens component 24, and the fourth lens component 48 may be contiguous with the second lens component 28. The central third image panel 20 is referred to as being a "shared" image panel, in that a portion of the image light is directed from the third image panel 20 to the right eye, and a portion of the image light is directed from the third image panel 20 to the left eye.

In the above structural configuration, components of the optical arrangement form part of a hinged configuration along which the HMD system can be folded when not in use. The hinged configuration may be combined with any HMD configuration including multiple image panels and/or segmented eyepiece lens components. An advantage of this hinged configuration is that a user can fold the HMD system for ease of storage and transportation while maintaining a high level of image quality during use. In exemplary embodiments, a head-mounted display (HMD) system includes an optical arrangement; a first image panel, wherein the optical arrangement includes a first portion that directs image light from the first image panel along a first optical pathway; and a second image panel, wherein the optical arrangement includes a second portion that directs image light from the second image panel along a second optical pathway different from the first optical pathway. The optical arrangement is reconfigurable between a first position and a second position that maintains the first and second optical pathways, and the HMD system has a different form factor when the optical arrangement is in the second position as compared to the first position.

The optical arrangement includes at least one segmented optical component, wherein segments of the segmented optical component are moveable relative to each other to reconfigure the optical arrangement between the first position and the second position, such as by rotation about a hinge structure. In particular, the at least one segmented optical component may include a first lens assembly comprising lens segments connected by a first hinge structure, and the lens segments of the first lens assembly are rotatable relative to each other about the first hinge structure. The at least one segmented optical component further may include a second lens assembly comprising lens segments connected by a second hinge structure, and the lens segments of the second lens assembly are rotatable relative to each other about the second hinge structure.

Referring to FIG. 1, for each eyepiece of the HMD system 10, in the optical arrangement a lens assembly includes segmented lens components that make up each eyepiece, and a hinge structure having a hinge element about which the segmented lens components can be folded. The hinge element, which is not part of the segmented lens components, is located such that the hinge element does not obstruct a user's view when looking into the eyepiece during use of the HMD system. Such a lens assembly configuration is provided in each eyepiece respectively for the left eye and the right eye. Accordingly, as one eyepiece configuration (e.g., for the right eye 16), HMD system 10 includes a first lens assembly 50 that includes the lens segment 24 and the lens segment 46 that are rotatable about each other via a first hinge element 52. Similarly, as the other eyepiece configuration (e.g., for the left eye 18), HMD system 10 further includes a second lens assembly 54 that includes the lens segment 28 and the lens segment 48 that are rotatable about each other via a second hinge element 56.

As defined with reference to the HMD system 10, the z-axis points in a direction from the user to the HMD system when the HMD system is an orientation of use, and x- and y-axes follow a right hand rule convention. In FIG. 1, the z- and x-axes are identified, and the y-axis is perpendicular through the page. With the directional axes so defined, an axis of rotation of the lens segments of each of the first and second lens assemblies may be about the y-axis in exemplary embodiments, such as shown in FIG. 1. FIG. 1 illustrates the HMD system 10 with the first and second lens assemblies in a first position corresponding to an unfolded state. The first and second lens assemblies are foldable from the first position to a second position corresponding to a folded state.

Figure 2:
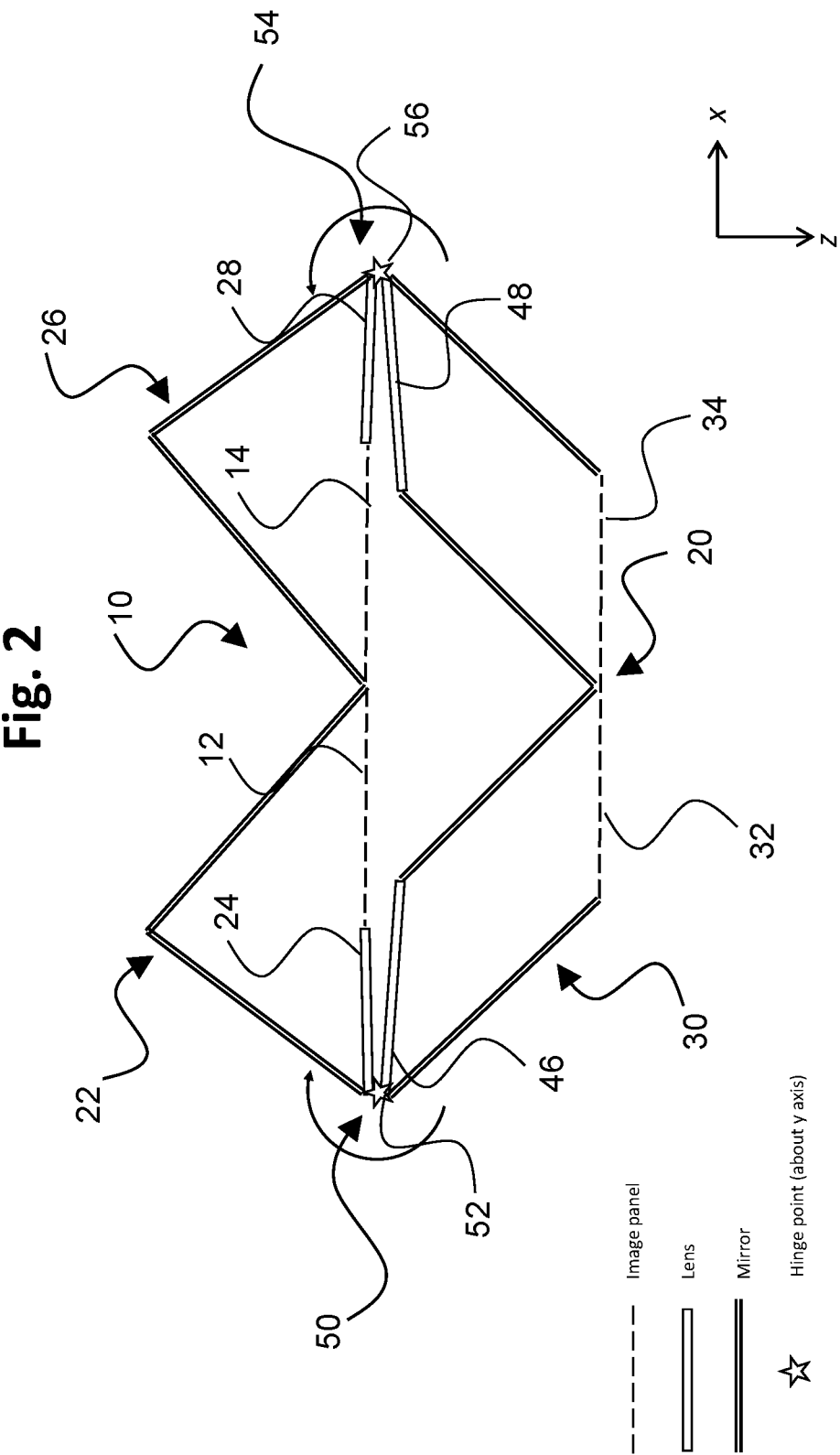
FIG. 2 is a drawing depicting a top view of the exemplary HMD system of FIG. 1, with the HMD system being in a folded state.

In particular, FIG. 2 is a drawing depicting a top view of the exemplary HMD system 10 of FIG. 1, with the HMD system 10 being in the folded state. In particular, comparing FIG. 2 to FIG. 1, the first and second lens assemblies have been folded from the first position to the second position corresponding to the folded state. Looking at the more specific components of the first lens assembly 50, the lens segment 24 has been rotated relative to the lens segment 46 about the first hinge element 52, as illustrated by the left arrow in FIG. 2. Looking at the more specific components of the second lens assembly 54, the lens segment 28 has been rotated relative to the lens segment 48 about the second hinge element 56, as illustrated by the right arrow in FIG. 2. Again, in this particular embodiment of FIGS. 1 and 2, such rotations are about the y-axis (which is perpendicular through the page) as indicated by the referenced arrows in FIG. 2.

Having separate optical pathways with segmented eyepiece lens components and multiple image panels allows the different components of the optical arrangement in the HMD system to be rotated with respect to one another, so that the optical components can be separated and realigned conveniently. In FIGS. 1 and 2, a first portion of the optical arrangement, including mirror assembly 22 and lens segment 24, directs image light from the first image panel 12 along a first optical pathway. Similarly, a second portion of the optical arrangement, including mirror assembly 26 and lens segment 28, directs image light from the second image panel 14 along a second optical pathway different from the first optical pathway. When the optical arrangement is moved between the first (unfolded) and second (folded) positions, the first and second optical pathways are maintained, as the relative positioning of the components of the first and second portions of the optical arrangement is not changed. However, by folding the first and second portions of the optical arrangement about lens elements 46 and 48, the overall form factor of the HMD system is changed so as to be more compact.

This principle could be applied to any configuration of an HMD system having segmented lens components within a respective eyepiece, and/or multiple image panels. In this manner, the HMD system of the present disclosure is highly portable for easy storage and transport while maintaining a high level of image quality during use. In particular, segmented components of the optical arrangement are foldable, rather than just having foldable housing elements. By being able to fold via components of the optical arrangement, a more compact form factor is achieved. In addition, the optical components do not have to be removed for storage and transport, as in a drop-in smartphone configuration, so high quality imaging components are maintained for use.

Figure 3:
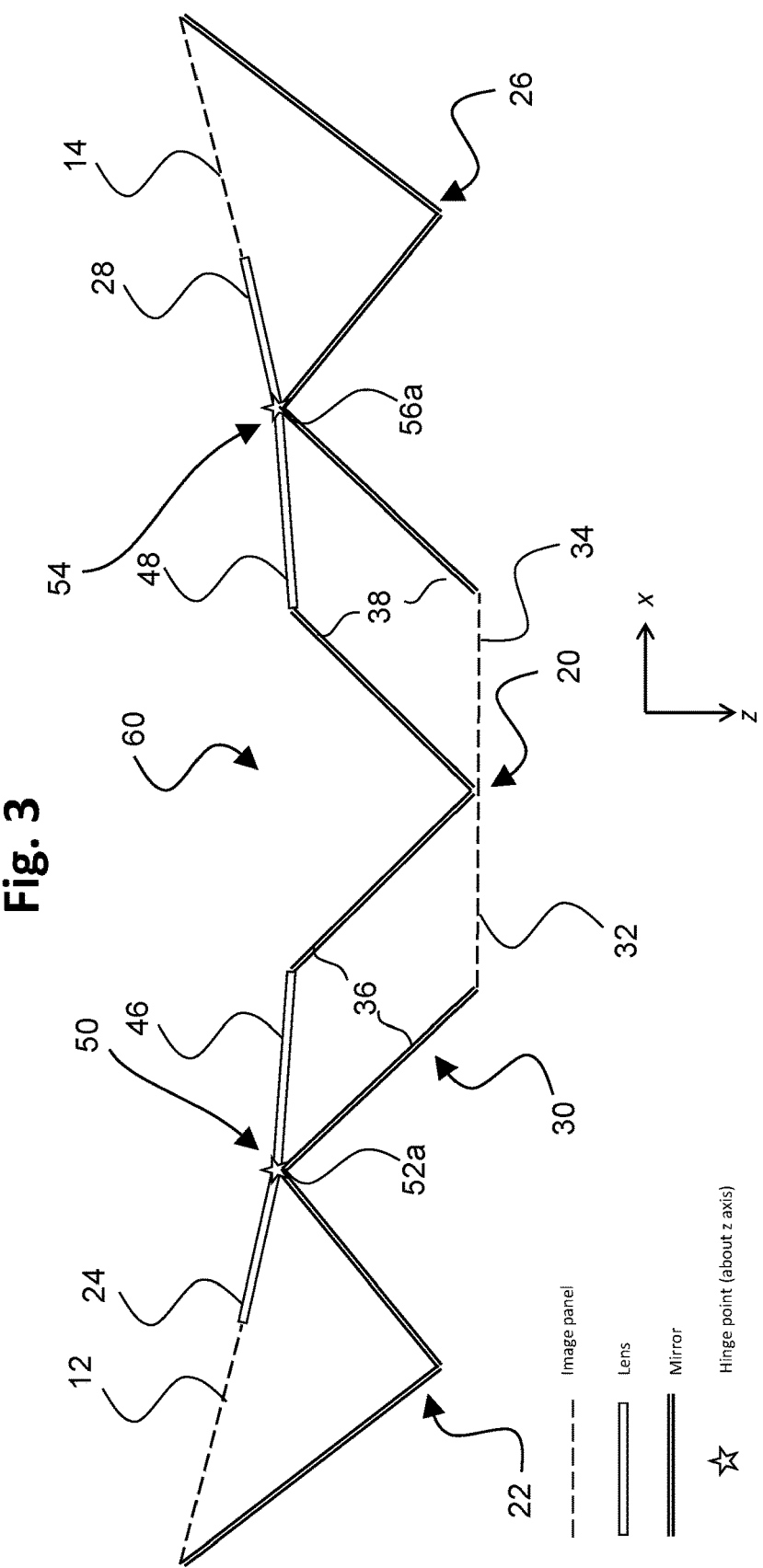
FIG. 3 is a drawing depicting a top view of another exemplary head-mounted display (HMD) system in accordance with embodiments of the present invention, with the HMD system being in an unfolded state.
Figure 4:
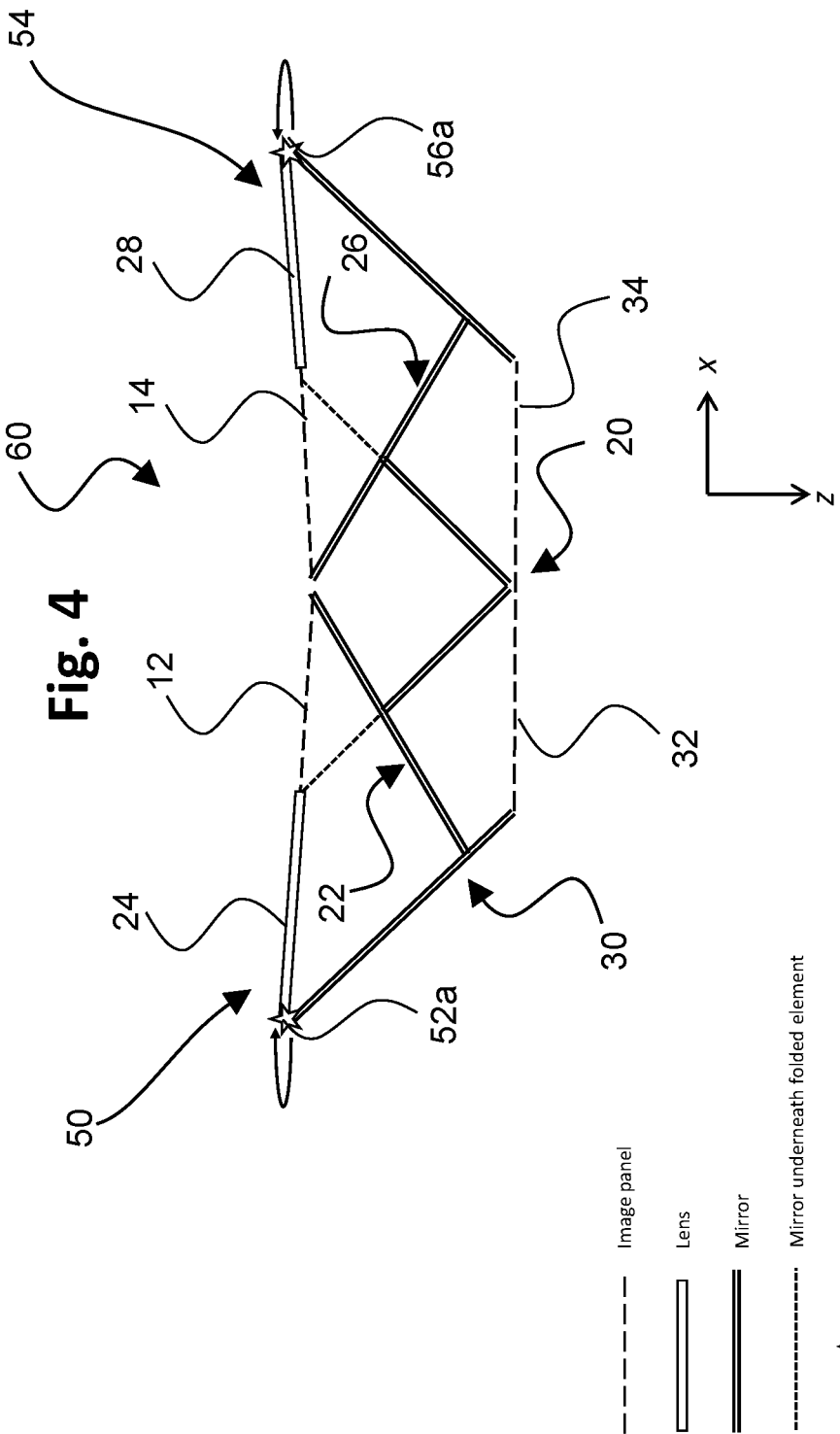
FIG. 4 is a drawing depicting a top view of the exemplary HMD system of FIG. 3, with the HMD system being in a folded state.
Figure 5:
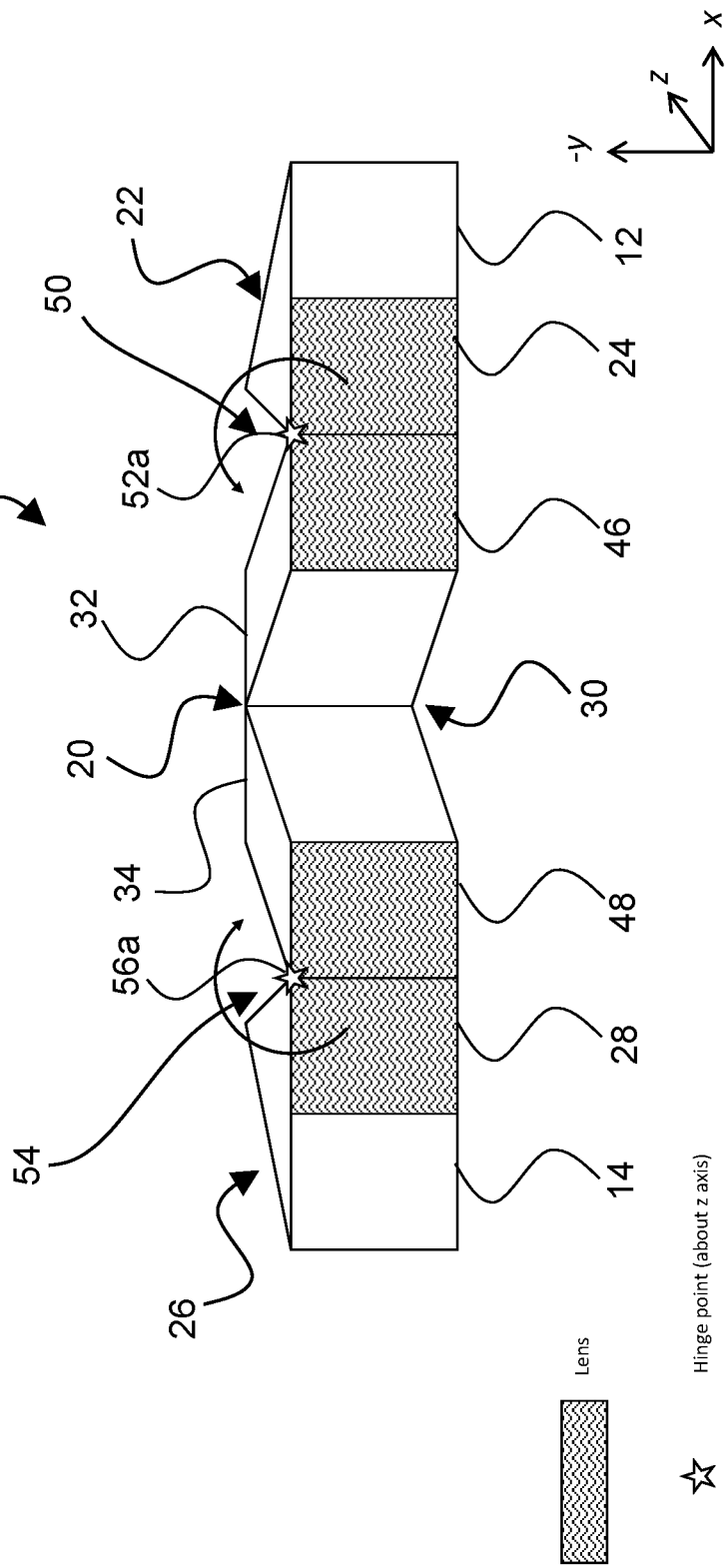
FIG. 5 is a drawing depicting an isometric view of the exemplary HMD system of FIG. 3, with the HMD system being in an unfolded state.

An axis of rotation for components of the optical arrangement of each eyepiece may be about the z-axis in alternative exemplary embodiments. FIG. 3 is a drawing depicting a top view of an exemplary head-mounted display (HMD) system 60 in accordance with embodiments of the present invention, with the HMD system 60 being in an unfolded state. FIG. 4 is a drawing depicting a top view of the exemplary HMD system 60 of FIG. 3, with the HMD system 60 being in a folded state. For z-axis rotation embodiments, isometric views are provided to aid in illustrating the folded verses the unfolded state due to the direction of the rotation. Accordingly, FIG. 5 is a drawing depicting an isometric view of the exemplary HMD system 60 of FIG. 3, with the HMD system 60 being in the unfolded state, and FIG. 6 is a drawing depicting an isometric view of the exemplary HMD system 60 of FIG. 3, with the HMD system 60 being in a folded state. The image panels, mirror components, and lens components are configured comparably as in the embodiment of FIGS. 1-2. Accordingly, reference numerals for some of the like components are omitted from FIGS. 3-6 (and likewise are omitted from subsequent figures) so as to more clearly identify the additional features of the various embodiments. Generally, in the configuration of FIGS. 3-6, the hinge elements are operable to permit the relative rotation of lens segments about the z-axis.

Similarly as in the previous embodiment, as defined with reference to the HMD system 60, the z-axis points in a direction from the user to the HMD system when the HMD system is an orientation of use, and x- and y-axes follow a right hand rule convention. FIGS. 3 and 5 illustrate the HMD system 60 with the first and second lens assemblies 50 and 54 in a first position corresponding to an unfolded state. The first and second lens assemblies 50 and 54 are foldable from the first position to a second position corresponding to a folded state, which is depicted in FIGS. 4 and 6. Comparing FIGS. 3 and 5 to FIGS. 4 and 6, the first and second lens assemblies have been folded from the first position to the second position corresponding to the folded state. Looking at the more specific components of the first lens assembly 50, the lens segment 24 has been rotated relative to the lens segment 46 about a first hinge element 52a, as illustrated by the arrows in the figures. Looking at the more specific components of the second lens assembly 54, the lens segment 28 has been rotated relative to the lens segment 48 about a second hinge element 56a, as illustrated by the arrows in the figures. Again, in contrast to the previous embodiment, in this particular embodiment of FIGS. 3-6, the hinge elements 52a and 56a are configured for relative rotation of the lens segments about the z-axis. In the isometric view of FIG. 6, it is seen that once folded, the shared central image panel 20 is internal relative to the folded-over components (and thus is not visible in this view), and the overall form factor is minimized.

In other exemplary embodiments, an axis of rotation of the hinge components for each eyepiece is off-edge, i.e. the axis of rotation it is not located along the adjoining face of either lens segment of a lens assembly. With such a configuration, adjoining faces of the lens segments only make contact when the HMD system is fully unfolded. An advantage of such configuration is that mechanical wear on the lens segments during folding and unfolding operations is minimized. As illustrative of embodiments having an off-edge axis of rotation, FIG. 7 is a drawing depicting a top view of an exemplary lens assembly 70 for an HMD system having an off-edge axis of rotation, with the lens assembly being in an unfolded state. FIG. 8 is a drawing depicting a top view of the exemplary lens assembly 70 of FIG. 7, with the lens assembly being in a partially folded state. FIGS. 7 and 8 depict said lens assembly as may be used in one of the eyepieces, and particular for the right eye as shown in the figures. A comparable lens assembly configuration would be employed in the other of such eyepieces, such as for example the left eye.

FIG. 7 illustrates the lens assembly 70 in a first position corresponding to an unfolded state. The lens assembly 70 is foldable from the first position to a second position corresponding to a folded state, and a partially folded state is depicted in FIG. 8. Comparing FIG. 7 to FIG. 8, lens assembly 70 has been partially folded from the first position to the second position corresponding to the partially folded state. Looking at the more specific components of the lens assembly 70, the lens segment 24 has been rotated relative to the lens segment 46 by operation of a hinge structure 72. In this embodiment, the hinge structure 72 includes a hinge element 74 that is supported by a hinge support 76. The hinge support 76 positions the hinge element 74 spaced apart from the lens segments to provide an off-edge axis of rotation relative to the lens elements.

As the lens segment 24 rotates relative to the lens segment 46 from the first position toward the second position, the lens segments move out of contact with each other. This reduces wear on the lens segments by the folding and unfolding operations. As the lens assembly 70 reaches the folded state, portions of the hinge support 76 linked by the hinge element 72 can collapse toward each other to achieve a compact configuration. For off-edge axis of rotation, the rotation occurs about the y-axis similarly as in the embodiment of FIGS. 1-2.

As seen in the example of FIGS. 7 and 8, at least one of the lens segments may have a tapered edge to minimize visibility of any scattered light produced during use at the boundary of the joining of the lens segments in the unfolded state. In the depicted example, lens segment 46 has a tapered edge 78, although the tapered edge alternatively may be provided on the lens segment 24. When fully unfolded, a vector 80 (see the dashed arrow in FIG. 7) that points from said boundary of joining to a center of the associated eye (e.g., right eye 16) lies within the adjoining boundary plane when the HMD system is in an orientation of use. With such configuration, as referenced the visibility of any light scattered at the boundary of joining of the two lens components is minimized.

FIG. 9 is a drawing depicting a top view of an exemplary lens assembly 70a for an HMD system having an off-edge axis of rotation, with the lens assembly being in an unfolded state, for the other eyepiece relative to FIGS. 7 and 8. FIG. 10 is a drawing depicting a top view of the exemplary lens assembly 70a of FIG. 9, with the lens assembly being in a partially folded state. Similarly for the other eyepiece, the lens assembly 70a is foldable from the first position to a second position corresponding to a folded state, and a partially folded state is depicted in FIG. 10. Comparing FIG. 9 to FIG. 10, lens assembly 70a has been partially folded from the first position to the second position corresponding to the partially folded state. Looking at the more specific components of the lens assembly 70a, the lens segment 28 has been rotated relative to the lens segment 48 by operation of a hinge structure 72a. The hinge structure 72a likewise includes a hinge element 74a that is supported by a hinge support 76a. The hinge support 76a positions the hinge element 74a spaced apart from the lens segments to provide an off-edge axis of rotation relative to the lens elements.

As the lens segment 28 rotates relative to the lens segment 48 from the first position toward the second position, the lens segments move out of contact with each other. This again reduces wear on the lens segments by the folding and unfolding operations. As the lens assembly 70a reaches the folded state, portions of the hinge support 76a linked by the hinge element 72a can collapse toward each other to achieve a compact configuration. For off-edge axis of rotation, the rotation occurs about the y-axis similarly as in the embodiment of FIGS. 1-2.

As also seen in the example of FIGS. 9 and 10, at least one of the lens segments may have a tapered edge to minimize visibility of any scattered light produced during use at the boundary of the joining of the lens segments in the unfolded state. In the depicted example, lens segment 48 has a tapered edge 78a, although the tapered edge alternatively may be provided on the lens segment 28. When fully unfolded, a vector 80a (see the dashed arrow in FIG. 9) that points from said boundary of joining to a center of the associated eye (e.g., left eye 18) lies within the adjoining boundary plane when the HMD system is in an orientation of use. With such configuration, as referenced the visibility of any light scattered at the boundary of joining of the two lens components is minimized.

An aspect of the invention is a head-mounted display (HMD) system that is reconfigurable into a compact arrangement for easy transport and storage. In exemplary embodiments, the HMD system includes an optical arrangement; a first image panel, wherein the optical arrangement includes a first portion that directs image light from the first image panel along a first optical pathway; and a second image panel, wherein the optical arrangement includes a second portion that directs image light from the second image panel along a second optical pathway different from the first optical pathway. The optical arrangement is reconfigurable between a first position and a second position that maintains the first and second optical pathways, and the HMD system has a different form factor when the optical arrangement in the second position as compared to the first position. The HMD system may include one or more of the following features, either individually or in combination.

In an exemplary embodiment of the HMD system, the optical arrangement includes at least one segmented optical component, wherein segments of the segmented optical component are moveable relative to each other to reconfigure to the optical arrangement between the first position and the second position.

In an exemplary embodiment of the HMD system, the at least one segmented optical component includes a first lens assembly comprising lens segments connected by a first hinge structure, and the lens segments of the first lens assembly are rotatable relative to each other about the first hinge structure; and the at least one segmented optical component further includes a second lens assembly comprising lens segments connected by a second hinge structure, and the lens segments of the second lens assembly are rotatable relative to each other about the second hinge structure.

In an exemplary embodiment of the HMD system, one of the lens segments of the first lens assembly is a component of the first portion of the optical arrangement, and one of the lens segments of the second lens assembly is a component of the second portion of the optical arrangement.

In an exemplary embodiment of the HMD system, as defined a z-axis points in a direction from a user to the HMD system when the HMD system is an orientation of use, and x- and y-axes follow a right hand rule convention; and the lens segments rotate about the first hinge structure and the second hinge structure about the y-axis.

In an exemplary embodiment of the HMD system, as defined a z-axis points in a direction from a user to the HMD system when the HMD system is an orientation of use, and x- and y-axes follow a right hand rule convention; and the lens segments rotate about the first hinge structure and the second hinge structure about the z-axis.

In an exemplary embodiment of the HMD system, an axis of rotation about the first and second hinge structures is off-edge relative to the lens segments.

In an exemplary embodiment of the HMD system, each of the first hinge structure and the second hinge structure comprises a hinge support that supports a hinge element, the hinge element being located off-edge relative to the lens segments.

In an exemplary embodiment of the HMD system, a lens segment in each of the first lens assembly and the second lens assembly has a tapered edge.

In an exemplary embodiment of the HMD system, the HMD system further includes a central image panel located between the first image panel and the second image panel, the central image panel including a first panel portion and a second panel portion. The optical arrangement directs light from the first panel portion and the second panel portion of the central image panel along different optical pathways; and the optical arrangement is configured such that light from the first image panel and the first panel portion of central image panel are emitted from the HMD system in a combined fashion in a first eye direction, and light from the second image panel and the second panel portion of the central image panel are emitted from the HMD system in a combined fashion in a second eye direction different from the first eye direction.

In an exemplary embodiment of the HMD system, the first and second image panels are located on a viewing side of the HMD system, and the central image panel is located on a non-viewing side of the HMD system.

In an exemplary embodiment of the HMD system, the first panel portion of central image panel and the second panel portion of the central image panel are of equal dimensions.

In an exemplary embodiment of the HMD system, the optical arrangement comprises a plurality of mirror components and a plurality of lens components, wherein the plurality of mirror components are configured to direct image light from the first, second, and central image panels along respective optical pathways to the plurality of lens components.

In an exemplary embodiment of the HMD system, the first portion of the optical arrangement includes a first mirror assembly that directs image light from the first image panel to a first lens component; the second portion of the optical arrangement includes a second mirror assembly that directs image light from the second image panel to a second lens component; and the optical arrangement further comprises a third mirror assembly that includes a first mirror portion that directs image light from the first panel portion of the central image panel to a third lens component, and a second mirror portion that directs image light from the second panel portion of the central image panel to a fourth lens component.

In an exemplary embodiment of the HMD system, the first mirror assembly and the second mirror assembly each has a folded arrangement including a plurality of mirror segments.

In an exemplary embodiment of the HMD system, the third mirror assembly includes first and second nose segments that meet to form a wedge shape, and first and second external segments that are spaced apart from and parallel to respective nose segments.

In an exemplary embodiment of the HMD system, the HMD system further includes a central image panel located between the first image panel and the second image panel, the central image panel including a first panel portion and a second panel portion. The optical arrangement directs light from the first panel portion and the second panel portion of the central image panel along different optical pathways; and the optical arrangement is configured such that light from the first image panel and the first panel portion of central image panel are emitted from the HMD system in a combined fashion in a first eye direction, and light from the second image panel and the second panel portion of the central image panel are emitted from the HMD system in a combined fashion in a second eye direction different from the first eye direction.

In an exemplary embodiment of the HMD system, the first portion of the optical arrangement includes a first mirror assembly that directs image light from the first image panel to a first lens component; the second portion of the optical arrangement includes a second mirror assembly that directs image light from the second image panel to a second lens component; and the optical arrangement further comprises a third mirror assembly that includes a first mirror portion that directs image light from the first panel portion of the central image panel to a third lens component, and a second mirror portion that directs image light from the second panel portion of the central image panel to a fourth lens component.

In an exemplary embodiment of the HMD system, the first lens component is one of the lens segments of the first lens assembly; the second lens component is one of the lens segments of the second lens assembly; the third lens component is another one of the lens segments of the first lens assembly, and the first and third lens components rotate relative to each other about the first hinge structure; and the fourth lens component is another one of the lens segments of the second lens assembly, and the second and fourth lens components rotate relative to each other about the second hinge structure.

In an exemplary embodiment of the HMD system, the first and second image panels are located on a viewing side of the HMD system, and the central image panel is located on a non-viewing side of the HMD system.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

The present invention relates to wearable displays, in particular for achieving small and light weight head-mounted display (HMD) systems. Hardware manufactured using this disclosure may be useful in the fields of virtual reality (VR) and augmented reality (AR) for both consumer and professional markets. HMD systems manufactured in accordance with this disclosure could have applications including gaming, entertainment, task support, medical, industrial design, navigation, transport, translation, education, and training.

REFERENCE SIGNS LIST

10—head-mounted display (HMD) system
12—first image panel
14—second image panel
16—right eye
18—left eye
20—third or shared image panel
22—first mirror assembly
24—first lens component
26—second mirror assembly
28—second lens component
30—third mirror assembly
32—first image panel portion
34—second image panel portion
36—first mirror portion
38—second mirror portion
44—user's nose
46—third lens component
48—fourth lens component
50—first lens assembly
52—first hinge element
52a—first hinge element
54—second lens assembly
56—second hinge element
56a—second hinge element
60—head-mounted display (HMD) system
70—lens assembly
70a—lens assembly
72—hinge structure
72a—hinge structure
74—hinge element 74a—hinge element
76—hinge support
76a—hinge support
78—tapered edge
78a—tapered edge
80—vector relative to eye
80a—vector relative to eye

What is claimed is:

1. A head-mounted display (HMD) system comprising:
an optical arrangement;
a first image panel, wherein the optical arrangement includes a first portion that directs image light from the first image panel along a first optical pathway; and
a second image panel, wherein the optical arrangement includes a second portion that directs image light from the second image panel along a second optical pathway different from the first optical pathway;
wherein the optical arrangement is reconfigurable between a first position and a second position that maintains the first and second optical pathways, and the HMD system has a different form factor when the optical arrangement in the second position as compared to the first position;
wherein the optical arrangement includes at least one segmented optical component, wherein segments of the segmented optical component are moveable relative to each other to reconfigure to the optical arrangement between the first position and the second position;
wherein the at least one segmented optical component includes a first lens assembly comprising lens segments connected by a first hinge structure, and the lens segments of the first lens assembly are rotatable relative to each other about the first hinge structure; and
the at least one segmented optical component further includes a second lens assembly comprising lens segments connected by a second hinge structure, and the lens segments of the second lens assembly are rotatable relative to each other about the second hinge structure.

2. The HMD system of claim 1, wherein one of the lens segments of the first lens assembly is a component of the first portion of the optical arrangement, and one of the lens segments of the second lens assembly is a component of the second portion of the optical arrangement.

3. The HMD system of claim 1, wherein as defined a z-axis points in a direction from a user to the HMD system when the HMD system is an orientation of use, and x- and y-axes follow a right hand rule convention; and
the lens segments rotate about the first hinge structure and the second hinge structure about the y-axis.

4. The HMD system of claim 1, wherein as defined a z-axis points in a direction from a user to the HMD system when the HMD system is an orientation of use, and x- and y-axes follow a right hand rule convention; and
the lens segments rotate about the first hinge structure and the second hinge structure about the z-axis.

5. The HMD system of claim 1, wherein an axis of rotation about the first and second hinge structures is off-edge relative to the lens segments.

6. The HMD system of claim 5, wherein each of the first hinge structure and the second hinge structure comprises a hinge support that supports a hinge element, the hinge element being located off-edge relative to the lens segments.

7. The HMD system of claim 5, wherein a lens segment in each of the first lens assembly and the second lens assembly has a tapered edge.

8. The HMD system of claim 1, further comprising a central image panel located between the first image panel and the second image panel, the central image panel including a first panel portion and a second panel portion;
wherein the optical arrangement directs light from the first panel portion and the second panel portion of the central image panel along different optical pathways; and
wherein the optical arrangement is configured such that light from the first image panel and the first panel portion of central image panel are emitted from the HMD system in a combined fashion in a first eye direction, and light from the second image panel and the second panel portion of the central image panel are emitted from the HMD system in a combined fashion in a second eye direction different from the first eye direction.

9. The HMD system of claim 8, wherein the first and second image panels are located on a viewing side of the HMD system, and the central image panel is located on a non-viewing side of the HMD system.

10. The HMD system of claim 8, wherein the first panel portion of central image panel and the second panel portion of the central image panel are of equal dimensions.

11. The HMD system of claim 8, wherein the optical arrangement comprises a plurality of mirror components and a plurality of lens components, wherein the plurality of mirror components are configured to direct image light from the first, second, and central image panels along respective optical pathways to the plurality of lens components.

12. The HMD system of claim 11, wherein:
the first portion of the optical arrangement includes a first mirror assembly that directs image light from the first image panel to a first lens component;
the second portion of the optical arrangement includes a second mirror assembly that directs image light from the second image panel to a second lens component; and
the optical arrangement further comprises a third mirror assembly that includes a first mirror portion that directs image light from the first panel portion of the central image panel to a third lens component, and a second mirror portion that directs image light from the second panel portion of the central image panel to a fourth lens component.

13. The HMD system of claim 12, wherein the first mirror assembly and the second mirror assembly each has a folded arrangement including a plurality of mirror segments.

14. The HMD system of claim 12, wherein the third mirror assembly includes first and second nose segments that meet to form a wedge shape, and first and second external segments that are spaced apart from and parallel to respective nose segments.

15. The HMD system of claim 12, wherein:
the first lens component is one of the lens segments of the first lens assembly;
the second lens component is one of the lens segments of the second lens assembly;
the third lens component is another one of the lens segments of the first lens assembly, and the first and third lens components rotate relative to each other about the first hinge structure; and
the fourth lens component is another one of the lens segments of the second lens assembly, and the second and fourth lens components rotate relative to each other about the second hinge structure.

* * * * *